US009285896B2

(12) United States Patent
Miyamoto

(10) Patent No.: US 9,285,896 B2
(45) Date of Patent: Mar. 15, 2016

(54) INFORMATION PROCESSING APPARATUS AND INFORMATION PROCESSING METHOD

(71) Applicant: FUJI XEROX CO., LTD., Minato-ku, Tokyo (JP)

(72) Inventor: Shinichi Miyamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 524 days.

(21) Appl. No.: 13/773,138

(22) Filed: Feb. 21, 2013

(65) Prior Publication Data
US 2014/0009444 A1    Jan. 9, 2014

(30) Foreign Application Priority Data
Jul. 9, 2012   (JP) ................... 2012-153743

(51) Int. Cl.
G06F 3/033   (2013.01)
G06F 3/0354  (2013.01)

(52) U.S. Cl.
CPC ............ G06F 3/033 (2013.01); G06F 3/03545 (2013.01)

(58) Field of Classification Search
CPC .............................. G06F 3/033; G06F 3/03545
USPC ................... 702/182; 345/173, 156, 180, 179;
178/19.01, 19.05; 715/209, 200
See application file for complete search history.

(56) References Cited

U.S. PATENT DOCUMENTS

| 5,294,792 | A | * | 3/1994 | Lewis | G06F 3/03545 250/221 |
| 5,453,762 | A | * | 9/1995 | Ito | G06F 3/03545 345/156 |
| 5,672,852 | A | * | 9/1997 | Fukuzaki | G06F 3/046 178/18.07 |
| 7,483,018 | B2 | * | 1/2009 | Oliver | G06F 3/03545 178/19.01 |
| 8,169,423 | B2 | * | 5/2012 | Takeuchi | G06F 3/0317 178/19.05 |
| 8,358,964 | B2 | * | 1/2013 | Radtke | G06F 3/03545 345/179 |
| 8,570,307 | B2 | * | 10/2013 | Takeuchi | G06F 3/0317 178/19.05 |
| 2001/0024193 | A1 | * | 9/2001 | Fahraeus | G06F 3/0317 345/173 |
| 2002/0126105 | A1 | * | 9/2002 | O'Donnell, Jr. | G06K 9/222 345/179 |
| 2005/0212780 | A1 | * | 9/2005 | Tokkonen | G06F 3/803545 345/179 |

(Continued)

FOREIGN PATENT DOCUMENTS

| JP | 6-162034 A | 6/1994 |
| JP | 2006-072601 A | 3/2006 |
| JP | 2007-133550 A | 5/2007 |

*Primary Examiner* — Carol S Tsai
(74) *Attorney, Agent, or Firm* — Sughrue Mion, PLLC

(57) ABSTRACT

An information processing apparatus includes an obtaining unit, a specifying unit, a calculating unit, and an evaluating unit. The obtaining unit obtains position information and time information. The position information indicates a position at which a writing action has been performed and which is specified in accordance with code information formed on a medium to which an operation result for operation items is input. The time information indicates a time at which the writing action was performed. The specifying unit specifies an operation item for which the writing action has been performed. The calculating unit calculates an operation time taken to perform an operation of the operation item for which the writing action has been performed. The evaluating unit detects an operation item in which a time difference between the calculated operation time and a predetermined standard operation time is longer than or equal to a predetermined time.

20 Claims, 7 Drawing Sheets

(56) References Cited

U.S. PATENT DOCUMENTS

| | | | |
|---|---|---|---|
| 2006/0244738 A1* | 11/2006 | Nishimura | G06F 3/03545 345/179 |
| 2007/0188478 A1* | 8/2007 | Silverstein | G06F 3/03542 345/179 |
| 2007/0227785 A1* | 10/2007 | Katsurahira | G06F 3/046 178/18.07 |
| 2008/0285070 A1* | 11/2008 | Takeuchi | G06F 3/0317 358/1.15 |
| 2011/0018844 A1* | 1/2011 | Ko | G06F 3/03545 345/179 |

* cited by examiner

FIG. 2

CHECKLIST FOR COOLING DEVICE

| OPERATION ORDER | INSPECTION DATE | 04/04 | 04/05 | 04/06 | 04/07 | 04/08 |
|---|---|---|---|---|---|---|
| | MEASUREMENT TIME | 7:13 | | | | |
| 1 | INPUT TEMPERATURE | 18.1 | | | | |
| 2 | UNUSUAL NOISE | NONE | | | | |
| 3 | MOTOR CURRENT | 3.52 | | | | |

FIG. 3

| DOCUMENT ID | X0 COORDINATE | Y0 COORDINATE | X1 COORDINATE | Y1 COORDINATE | INPUT TIME |
|---|---|---|---|---|---|
| 1004 | 172 | 57 | 176 | 56 | 04/04/2011 07:13:49.13 |
| 1004 | 176 | 56 | 178 | 55 | 04/04/2011 07:13:49.14 |
| 1004 | 178 | 55 | 175 | 59 | 04/04/2011 07:13:49.15 |
| 1004 | 175 | 59 | 173 | 63 | 04/04/2011 07:13:49.16 |

FIG. 4

| OPERATION ITEMS | | 04/04/2011 |
|---|---|---|
| MEASUREMENT TIME | VALUE | 7:13 |
| | INPUT START TIME | 04/04/2011 07:13:52.02 |
| | INPUT END TIME | 04/04/2011 07:13:53.30 |
| | TIME TAKEN (SECONDS) | N/A |
| INPUT TEMPERATURE | VALUE | 18.1 |
| | INPUT START TIME | 04/04/2011 07:13:57.55 |
| | INPUT END TIME | 04/04/2011 07:13:58.59 |
| | TIME TAKEN (SECONDS) | 5.29 |
| UNUSUAL NOISE | VALUE | NONE |
| | INPUT START TIME | 04/04/2011 07:14:18.87 |
| | INPUT END TIME | 04/04/2011 07:14:20.80 |
| | TIME TAKEN (SECONDS) | 22.21 |
| MOTOR CURRENT | VALUE | 3.52 |
| | INPUT START TIME | 04/04/2011 07:16:34.60 |
| | INPUT END TIME | 04/04/2011 07:16:36.24 |
| | TIME TAKEN (SECONDS) | 135.44 |

FIG. 5

| OPERATION ITEMS | STANDARD OPERATION TIME (SECONDS) | ALLOWANCE TIME (+) | ALLOWANCE TIME (−) |
|---|---|---|---|
| INPUT TEMPERATURE | 10 | 5 | 5 |
| UNUSUAL NOISE | 20 | 10 | 5 |
| MOTOR CURRENT | 90 | 30 | 20 |
| TOTAL | 120 | 45 | 30 |

FIG. 6

| OPERATION ITEMS | STANDARD OPERATION TIME (SECONDS) | ACTUAL OPERATION TIME | DIFFERENCE FROM STANDARD |
|---|---|---|---|
| INPUT TEMPERATURE | 10 | 5.29 | −4.77 |
| UNUSUAL NOISE | 20 | 22.21 | +2.21 |
| MOTOR CURRENT | 90 | 135.44 | +45.44 |
| TOTAL | 120 | 162.94 | +42.94 |

FIG. 9

| OPERATION ITEMS | | 04/04/2011 |
|---|---|---|
| MEASUREMENT TIME | VALUE | 7:13 |
| | INPUT START TIME | 04/04/2011 07:13:52.02 |
| | INPUT END TIME | 04/04/2011 07:13:53.30 |
| | TIME TAKEN (SECONDS) | N/A |
| INPUT TEMPERATURE | VALUE | 18.1 |
| | INPUT START TIME | 04/04/2011 07:13:57.55 |
| | INPUT END TIME | 04/04/2011 07:13:58.59 |
| | TIME TAKEN (SECONDS) | 5.29 |
| UNUSUAL NOISE | VALUE | NONE |
| | INPUT START TIME | 04/04/2011 07:14:15.67 |
| | INPUT END TIME | 04/04/2011 07:14:20.80 |
| | TIME TAKEN (SECONDS) | 22.21 |
| MOTOR CURRENT | VALUE | 3.52 |
| | INPUT START TIME | 04/04/2011 07:14:18.60 |
| | INPUT END TIME | 04/04/2011 07:16:36.24 |
| | TIME TAKEN (SECONDS) | 135.44 |

US 9,285,896 B2

INFORMATION PROCESSING APPARATUS AND INFORMATION PROCESSING METHOD

CROSS-REFERENCE TO RELATED APPLICATIONS

This application is based on and claims priority under 35 USC 119 from Japanese Patent Application No. 2012-153743 filed Jul. 9, 2012.

BACKGROUND (i) Technical Field

The present invention relates to an information processing apparatus and an information processing method.

(ii) Related Art

Technologies for digitizing characters or the like which are manually input using an electronic pen are available. Electronic pens are used in, for example, production management operations, facility inspection operations, and so forth.

SUMMARY

According to an aspect of the invention, there is provided an information processing apparatus including an obtaining unit, a specifying unit, a calculating unit, and an evaluating unit. The obtaining unit obtains position information and time information. The position information indicates a position at which a writing action has been performed and which is specified in accordance with code information formed on a medium to which an operation result for operation items is input by the writing action. The time information indicates a time at which the writing action was performed. The specifying unit specifies, in accordance with the position information, an operation item for which the writing action has been performed. The calculating unit calculates, in accordance with the time information, an operation time taken to perform an operation of the operation item for which the writing action has been performed. The evaluating unit detects an operation item in which a time difference between the operation time calculated by the calculating unit and a predetermined standard operation time taken to perform the operation of the operation item for which the writing action has been performed is longer than or equal to a predetermined time.

BRIEF DESCRIPTION OF THE DRAWINGS

An exemplary embodiment of the present invention will be described in detail based on the following figures, wherein:

FIG. 2 is a diagram illustrating an example of a medium;

FIG. 3 is a diagram illustrating an example of stroke information;

FIG. 4 is a diagram illustrating an example of execution times of individual operation items;

FIG. 5 is a diagram illustrating an example of standard operation times;

FIG. 6 is a diagram illustrating an example of comparison between actual operation times and standard operation times;

FIG. 9 is a diagram illustrating another example of execution times.

DETAILED DESCRIPTION

Figure 1:
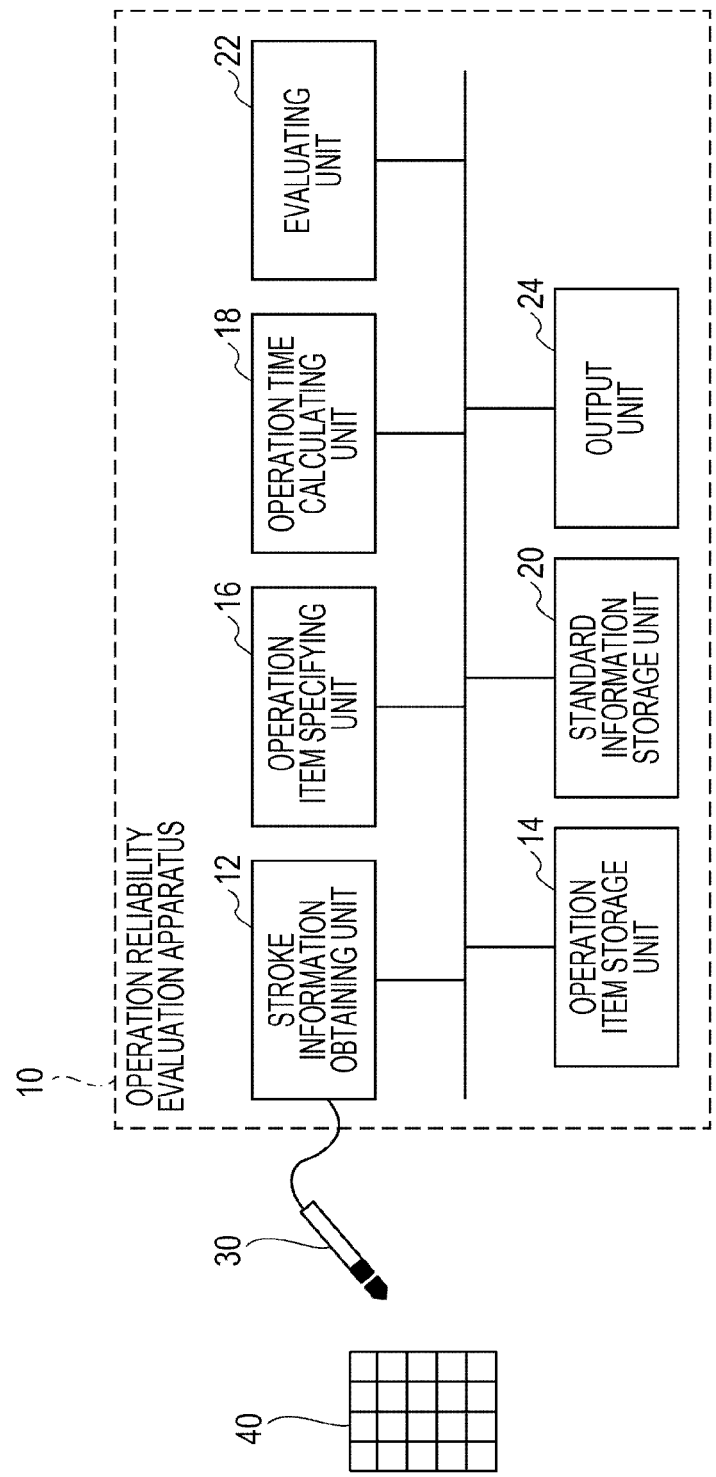
FIG. 1 is a block diagram illustrating an example of an information processing apparatus according to an exemplary embodiment of the present invention.

An information processing apparatus (operation reliability evaluation apparatus) according to an exemplary embodiment of the present invention will be described with reference to FIG. 1. An operation reliability evaluation system, which is an example of an information processing system according to the exemplary embodiment, includes an operation reliability evaluation apparatus 10 and an electronic pen 30. The electronic pen 30 is an example of a reading device that has a function of writing characters and figures on a medium 40, such as paper, and that has a function of reading code information, such as a code pattern image, formed on the medium 40. The operation reliability evaluation apparatus 10, which is an example of the information processing apparatus, evaluates the reliability of an operation which is performed using the electronic pen 30, on the basis of a signal output from the electronic pen 30.

The code information formed on the medium 40 includes identification information for identifying the medium 40 and position information indicating a position on the medium 40. A code pattern image serving as code information is, for example, an image which represents identification information and position information in accordance with a relative position relationship among plural dot images.

The electronic pen 30 includes a writing unit used for writing characters and figures on the medium 40, a pressure sensor that detects a writing action performed with the electronic pen 30 in accordance with a pressure applied to the tip of the pen, an irradiation unit that applies infrared light, an image capture element that captures an image on the medium 40, a processor that processes the image captured by the image capture element, a memory, and a communication unit. The processor detects a code pattern image from an image captured by the image capture element, and detects identification information and position information embedded in the code pattern image. Also, the processor measures a time. For example, the processor measures a time at which the pressure sensor detects a pressure. The processor may calculate a trail of the electronic pen 30 by using the position information and may generate writing information indicating the trail of the electronic pen 30. Alternatively, the electronic pen 30 does not generate writing information. In that case, the operation reliability evaluation apparatus 10 may calculate a trail of the electronic pen by using position information, thereby generating writing information indicating the trail. The memory stores detected identification information and position information in association with time information indicating the time at which a writing action was performed. Also, the memory may store writing information indicating a trail of the electronic pen 30 in association with time information indicating the time at which a writing action was performed. The communication unit transmits the information stored in the memory to the operation reliability evaluation apparatus 10 in a wired or wireless manner.

The operation of the electronic pen 30 will be described below. When a user (writer) starts writing using the electronic pen 30, the pressure sensor detects a writing action on the basis of a pressure. Accordingly, the processor starts a process of reading identification information and position information. The processor measures the time when the pressure sensor detects a pressure, the irradiation unit irradiates the medium 40 with infrared light, and the image capture element captures an image on the medium 40. The processor detects a code pattern image from the image captured by the image capture element, and detects identification information and position information embedded in the code pattern image. Then, the processor causes the memory to store the detected identification information and position information in association with time information indicating the time at which the writing action was performed. Also, the processor may calculate a trail of the electronic pen 30 by using the position information, and may cause the memory to store writing information indicating the trail in association with time information indicating the time at which the writing action was performed. Then, the communication unit transmits the information stored in the memory to the operation reliability evaluation apparatus 10 at a timing specified by the user or at a predetermined timing. In the following description, information representing the content which has been written on the medium 40 is referred to as "stroke information". Stroke information includes, for example, identification information for identifying the medium 40, position information indicating the position at which a writing action was performed, and time information indicating the time at which the writing action was performed.

The medium 40 according to the exemplary embodiment is not limited to paper, and may be a plastic sheet, such as an overhead projector (OHP) sheet, or a sheet made of another material. Also, the medium 40 may be electronic paper on which display content is electronically rewritable.

FIG. 2 illustrates an example of the medium 40. The medium 40 is, for example, a form used for inspecting facilities, and is a form to which an inspection result is to be input with a writing action by the user. The medium 40 illustrated in FIG. 2 is a checklist for a cooling device, and includes fields to which operation results for individual operation items are to be input. Examples of the operation items include "measurement time", "input temperature", "unusual noise", and "motor current". The order in which operations are performed is predetermined. For example, the operation of measuring "input temperature" is a first operation, the operation of checking "unusual noise" is a second operation, and the operation of measuring "motor current" is a third operation. In the example illustrated in FIG. 2, a measurement time (7:13), an input temperature (18.1), unusual noise (none), and a motor current (3.52) have been input to the medium 40 as operation results on an inspection date (04/04) by a writing action performed by the user using the electronic pen 30.

FIG. 3 illustrates a specific example of stroke information. Stroke information is, for example, a list showing sets of the positions of a start point and an end point of a line segment which has been input to the medium 40 by a writing action, and an input time at which the writing action was performed. The stroke information includes identification information for identifying the medium 40 (document ID). The coordinates (X0, Y0) correspond to the position of the start point of a line segment, and the coordinates (X1, Y1) correspond to the position of the end point of the line segment. The input time is a time at which the end point of a line segment was input to the medium 40. In this way, the stroke information indicates the correspondence among the coordinates (X0, Y0) at the start point of a line segment, the coordinates (X1, Y1) at the end point of the line segment, and the input time at which the end point of the line segment was input to the medium 40.

Next, the operation reliability evaluation apparatus 10, which is an example of the information processing apparatus, will be described. As illustrated in FIG. 1, the operation reliability evaluation apparatus 10 includes a stroke information obtaining unit 12, an operation item storage unit 14, an operation item specifying unit 16, an operation time calculating unit 18, a standard information storage unit 20, an evaluating unit 22, and an output unit 24.

The stroke information obtaining unit 12 obtains stroke information transmitted from the electronic pen 30.

The operation item storage unit 14 stores operation item correspondence information indicating the correspondence between a position (region) on the medium 40 and an operation item. In the example illustrated in FIG. 2, the operation item correspondence information indicates the correspondence between positions on the medium 40 and the individual operation items (for example, "measurement time", "input temperature", "unusual noise", and "motor current").

The operation item specifying unit 16 refers to the operation item correspondence information stored in the operation item storage unit 14, thereby specifying an operation item for which a writing action has been performed, on the basis of the position indicated by the stroke information. For example, the operation item specifying unit 16 refers to the operation item correspondence information, thereby specifying the operation items corresponding to the positions of the individual line segments indicated by the stroke information, and assigning pieces of information about the individual line segments (position information about the start and end points and time information indicating an input time) to the corresponding operation items. Accordingly, the operation items for which operation results have been input are specified.

The operation time calculating unit 18 calculates an operation time taken to perform an operation of an operation item, on the basis of the time indicated by the stroke information. First, the operation time calculating unit 18 obtains the times at which writing actions for individual operation items started (input start times) and the times at which the writing actions for the individual operation items ended (input end times). For example, the operation time calculating unit 18 obtains the input time of a line segment which was input to a region corresponding to a certain operation item at the earliest time (the input time of the end point of the line segment), as the input start time of the operation item. Also, the operation time calculating unit 18 obtains the input time of a line segment which was input to the region corresponding to the certain operation item at the latest time (the input time of the end point of the line segment), as the input end time of the operation item. The operation time calculating unit 18 obtains input start times and input end times for the individual operation items. Then, the operation time calculating unit 18 calculates the time difference between the input end time of the first operation item for which a writing action was performed first and the input end time of the second operation item for which a writing action was performed next to the first operation item. The time difference is regarded as the operation time taken to perform the operation of the second operation item. That is, the operation time calculating unit 18 calculates the time interval from when the writing action for the first operation item was completed to when the writing action for the second operation item was completed, and the time interval is regarded as the operation time taken to perform the operation of the second operation item.

The process of calculating an operation time will be described in detail with reference to FIG. 4. FIG. 4 is a diagram illustrating an example of execution times of the individual operation items, and illustrates the values, input start times, input end times, and times taken (operation times) of individual operation items (for example, "measurement time", "input temperature", "unusual noise", and "motor current"). The values as operation results are character strings which are input to the fields of the individual operation items of the medium 40 by using the electronic pen 30. The input start time of each operation item is the input time of a line segment which was input to the region corresponding to the operation item at the earliest time (the input time of the end point of the line segment). The input end time of each operation item is the input time of a line segment which was input to the region corresponding to the operation item at the latest time (the input time of the end point of the line segment). For example, the input start time of the operation item "measurement time" is the input time of a line segment which was input to the region corresponding to the operation item "measurement time" at the earliest time (the input time of the end point of the line segment). The input end time of the operation item "measurement time" is the input time of a line segment which was written to the region corresponding to the operation item "measurement time" at the latest time (the input time of the end point of the line segment). The operation time calculating unit 18 calculates the time difference between the input end time of the operation item "measurement time" and the input end time of the operation item "input temperature" for which a writing action was performed next to the operation item "measurement time", and the time difference is regarded as the operation time taken to perform the operation of the operation item "input temperature". That is, the operation time calculating unit 18 calculates the time interval from when the writing action for the operation item "measurement time" was completed to when the writing action for the next operation item "input temperature" was completed, and the time interval is regarded as the operation time taken to perform the operation of the operation item "input temperature". In the example illustrated in FIG. 4, the operation time taken to perform the operation of the operation item "input temperature" is 5.29 seconds, the operation time taken to perform the operation of the operation item "unusual noise" is 22.21 seconds, and the operation time taken to perform the operation of the operation item "motor current" is 135.44 seconds. In the following description, the operation time calculated by the operation time calculating unit 18 may be referred to as "actual operation time".

The standard information storage unit 20 stores information indicating standard operation times which are supposed to be taken to perform the operations of the individual operation items, and information indicating allowance times which are allowed in the operations of the individual operation items. Also, the standard information storage unit 20 may store information indicating the total sum of the standard operation times of plural operation items. For example, the standard information storage unit 20 stores information indicating the total sum of the standard operation times of all the operation items performed for inspection of facilities. The standard operation times and allowance times are predetermined through experiences, for example.

FIG. 5 illustrates an example of standard operation times. FIG. 5 illustrates the standard operation times of the individual operation items, the allowance times for the standard operation times, the total standard operation time, and the allowance time for the total standard operation time. The allowance times include an upper-limit allowance time (positive-side allowance time) and a lower-limit allowance time (negative-side allowance time). Thus, the range defined by "standard operation time±allowance time" is the range of allowable operation time. In the following description, the range defined by "standard operation time±allowance time" may be referred to as a "standard range". The total standard operation time is the total sum of the standard operation times of all the operation items. The allowance time for the total standard operation time is the total sum of the allowance times of all the operation items. For example, the standard operation time of the operation item "input temperature" is 10 seconds, the upper-limit allowance time (positive-side allowance time) is 5 seconds, and the lower-limit allowance time (negative-side allowance time) is 5 seconds. That is, the standard range for the operation item "input temperature" is 5 to 15 seconds. The standard range for the operation item "unusual noise" is 15 to 30 seconds, and the standard range for the operation item "motor current" is 70 to 120 seconds. The standard range for all the operation items is 90 to 165 seconds.

The evaluating unit 22 compares actual operation times calculated by the operation time calculating unit 18 with standard operation times, and detects an operation item in which the time difference between the actual operation time and the standard operation time is longer than or equal to a predetermined time. For example, the evaluating unit 22 detects an operation item in which the actual operation time is outside the standard range (standard operation time±allowance time). For example, if the actual operation time is below the standard range (shorter than the lower-limit allowance time), it indicates that the operation was performed in a time shorter than the supposed standard time, and thus there is a possibility that an inspection operation or the like has not been performed. If the actual operation time is above the standard range (longer than the upper-limit allowance time), it indicates that the operation was performed in a time longer than the supposed standard time, and thus there is a possibility that an unnecessary operation or an unscheduled operation has been performed. Thus, an operation item in which the actual operation time is outside the standard range is detected as an operation item for which an operation which does not satisfy a predetermined standard has been performed. The evaluating unit 22 may output a warning if the evaluating unit 22 detects an operation item in which the actual operation time is outside the standard range. If the evaluating unit 22 detects an operation item in which the actual operation time is outside the standard range, the evaluating unit 22 may output a warning in accordance with the time difference between the total sum of the actual operation times of all the operation items for which operation results have been input and the total sum of the predetermined standard operation times.

FIG. 6 illustrates an example of comparison between actual operation times and standard operation times. For example, the actual operation time of the operation item "input temperature" is 5.29 seconds, and the difference from the standard operation time (10 seconds) is −4.77 seconds. Since the standard range of the operation item "input temperature" is 5 to 15 seconds, the actual operation time of the operation item "input temperature" is within the standard range. The actual operation time of the operation item "unusual noise" is 22.21 seconds, and the difference from the standard operation time (20 seconds) is +2.21 seconds. Since the standard range of the operation item "unusual noise" is 15 to 30 seconds, the actual operation time of the operation item "unusual noise" is within the standard range. In contrast, the actual operation time of the operation item "motor current" is 135.44 seconds, and the difference from the standard operation time (90 seconds) is +45.44 seconds. Since the standard range of the operation item "motor current" is 70 to 120 seconds, the actual operation time of the operation item "motor current" is not within the standard range, and is longer than the positive-side allowance time by 15.44 seconds. In this case, the evaluating unit 22 detects the operation item "motor current" as an operation item for which an operation which does not satisfy the predetermined standard has been performed. The evaluating unit 22 may create the table showing the comparison result illustrated in FIG. 6.

The output unit 24 outputs an evaluation result generated by the evaluating unit 22. For example, the output unit 24 outputs information or warning showing the operation item detected by the evaluating unit 22. The output unit 24 is, for example, a display device, and displays information or warning indicating an operation item. The output unit 24 may display the operation item detected by the evaluating unit 22 by distinguishing it from the other operation items. For example, the output unit 24 may display the table of the comparison result illustrated in FIG. 6. In this case, the output unit 24 may display the operation item detected by the evaluating unit 22 (for example, "motor current") by distinguishing it from the other operation items. For example, the output unit 24 may cause the color of the field of the operation item "motor current" to be different from the color of the fields of the other operation items. Alternatively, the output unit 24 may be a communication interface, such as a network interface, and may transmit information or warning indicating an evaluation result generated by the evaluating unit 22 to an external apparatus via a communication path, such as a network.

Figure 7:
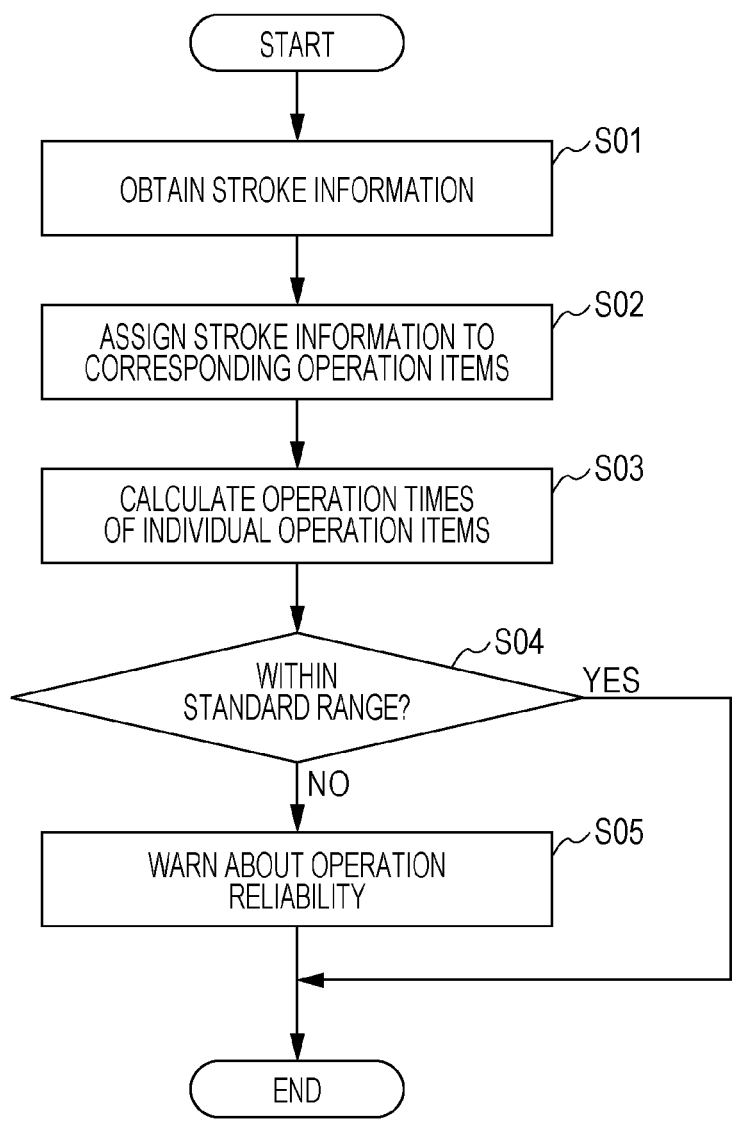
FIG. 7 is a flowchart illustrating an example of an overall process performed by the information processing apparatus according to the exemplary embodiment.
Figure 8:
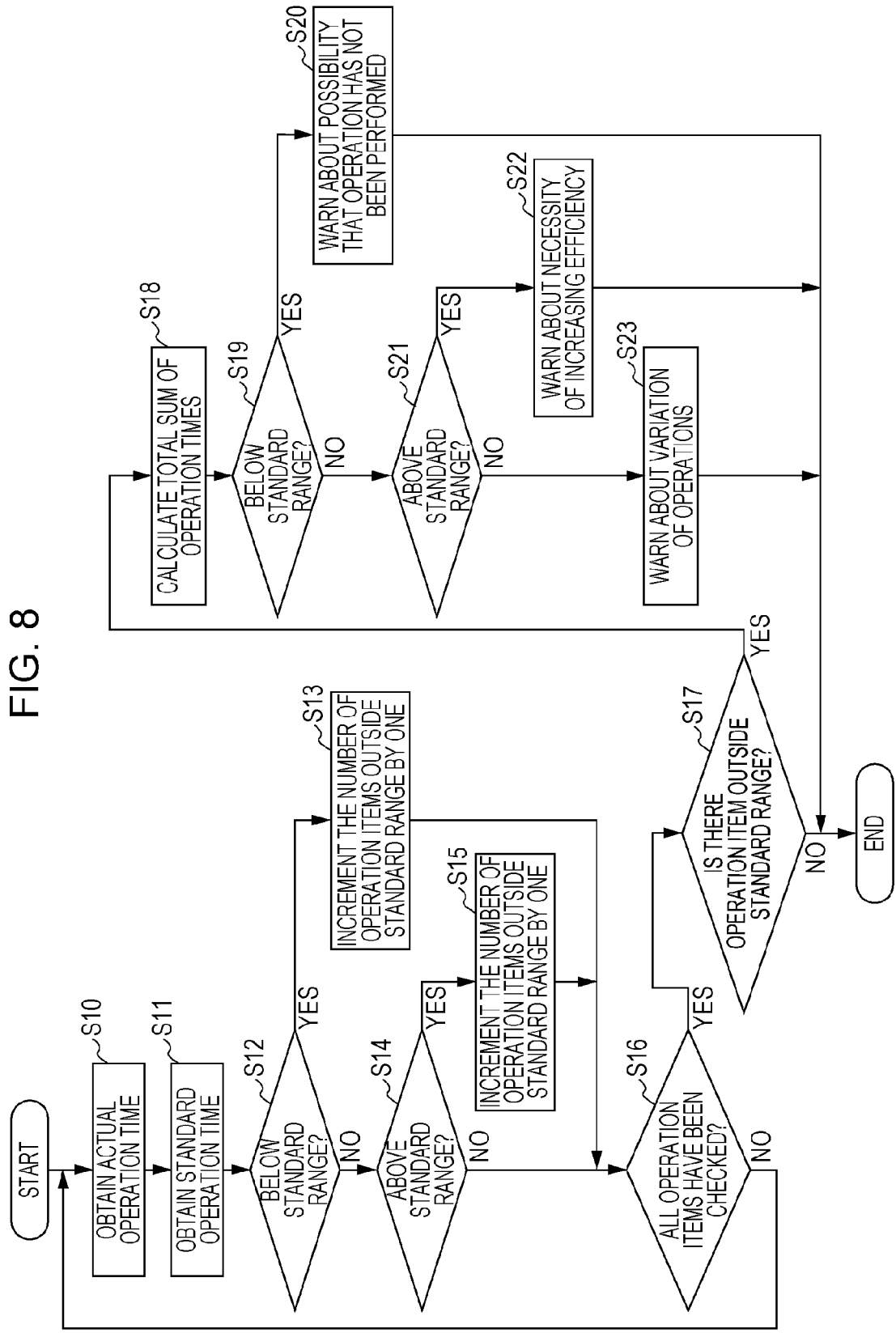
FIG. 8 is a flowchart illustrating an example of a process performed by the information processing apparatus according to the exemplary embodiment.

Next, an example of the process performed by the operation reliability evaluation apparatus 10 according to the exemplary embodiment will be described with reference to the flowcharts illustrated in FIGS. 7 and 8. First, an example of an overall process performed by the operation reliability evaluation apparatus 10 according to the exemplary embodiment will be described with reference to the flowchart illustrated in FIG. 7.

First, an operator performs an inspection operation or the like, and inputs an operation result to the fields of individual operation items of the checklist (medium 40) illustrated in FIG. 2 by using the electronic pen 30. Then, the electronic pen 30 transmits stroke information to the operation reliability evaluation apparatus 10 at a timing specified by the operator or at a predetermined timing.

In step S01, the stroke information obtaining unit 12 obtains the stroke information transmitted from the electronic pen 30, and outputs the stroke information to the operation item specifying unit 16.

In step S02, the operation item specifying unit 16 refers to the operation item correspondence information stored in the operation item storage unit 14, thereby specifying the operation items corresponding to the positions of individual line segments indicated by the stroke information, and assigns pieces of information about the individual line segments (position information about start and end points, and time information indicating input times) to the corresponding operation items.

In step S03, the operation time calculating unit 18 obtains the input start times and the input end times of the individual operation items, and calculates the time difference between the input end time of the operation item for which the writing action was performed first and the input end time of the operation item for which the writing action was performed next, and the time difference is regarded as the actual operation time taken to perform the operation of the next operation item. The operation time calculating unit 18 calculates the actual operation times of the individual operation items.

In step S04, the evaluating unit 22 compares, for each operation item, the actual operation time with the standard operation time. If the evaluating unit 22 detects an operation item in which the actual operation time is outside the standard range (standard operation time±allowance time), that is, "NO" in step S04, the evaluating unit 22 warns about operation reliability in step S05. The evaluating unit 22 may output a warning in accordance with the time difference between the total sum of the actual operation times of all the operation items for which operation results have been input and the total sum of the standard operation times. On the other hand, if the actual operation time is within the standard range (standard operation time±allowance time), that is, "YES" in step S04, the process ends.

Next, an example of a specific process performed by the operation reliability evaluation apparatus 10 according to the exemplary embodiment will be described with reference to the flowchart illustrated in FIG. 8. The description will be given mainly of the process performed by the evaluating unit 22.

The evaluating unit 22 obtains information indicating the actual operation time of a target operation item to be processed from the operation time calculating unit 18 in step S10, and obtains information indicating the standard operation time of the target operation item from the standard information storage unit 20 in step S11.

Subsequently, the evaluating unit 22 compares the actual operation time and the standard operation time of the target operation item. If the actual operation time is below the standard range (shorter than the lower-limit allowance time), that is, "YES" in step S12, the evaluating unit 22 increments the number of operation items outside the standard range by one in step S13. On the other hand, if the actual operation time is not below the standard range (not shorter than the lower-limit allowance time), that is, "NO" in step S12, but if the actual operation time is above the standard range (longer than the upper-limit allowance time), that is, "YES" in step S14, the evaluating unit 22 increments the number of operation items outside the standard range by one in step S15. After comparison between the actual operation time and the standard operation time has been performed on all the operation items for which operation results have been input, that is, "YES" in step S16, the process proceeds to step S17. On the other hand, if there is an operation item on which comparison between the actual operation time and the standard operation time has not been performed, that is, "NO" in step S16, the process from step S10 to step S15 is repeated until comparison between the actual operation time and the standard operation time has been performed on all the operation items for which operation results have been input.

If no operation items in which the actual operation time is outside the standard range (standard operation time±allowance time) are not detected by the evaluating unit 22, that is, "NO" in step S17, the process ends. In this case, the output unit 24 may display information indicating that the operations of all the operation items have been performed within the standard range. On the other hand, if an operation item in which the actual operation time is outside the standard range is detected by the evaluating unit 22, that is, "YES" in step S17, the operation time calculating unit 18 calculates the total sum of the actual operation times of all the operation items for which operation results have been input in step S18.

Subsequently, the evaluating unit 22 compares the total sum of the actual operation times with the total sum of the standard operation times. If the total sum of the actual operation times is below the standard range (shorter than the lower-limit allowance time for the total standard operation time), that is, "YES" in step S19, the evaluating unit 22 outputs a warning indicating that there is a possibility that an operation has not been performed in step S20. That is, if the total sum of the actual operation times is below the standard range, there is a possibility that a reliable operation has not been performed, and thus the evaluating unit 22 outputs a warning indicating the fact. The output unit 24 displays, for example, a warning indicating that there is a possibility that a reliable operation has not been performed.

On the other hand, if the total sum of the actual operation times is not below the standard range (not shorter than the lower-limit allowance time for the total standard operation time), that is, "NO in step S19", the process proceeds to step S21. If the total sum of the actual operation times is above the standard range (longer than the upper-limit allowance time for the total standard operation time), that is, "YES" in step S21, the evaluating unit 22 outputs a warning indicating that there is the necessity of increasing the operation efficiency in step S22. That is, if the total sum of the actual operation times is above the standard range, there is a possibility that an unnecessary operation or an unscheduled operation has been performed, and thus the evaluating unit 22 outputs a warning for prompting the user to increase the operation efficiency. The output unit 24 displays, for example, a warning for prompting the user to increase the operation efficiency.

If the total sum of the actual operation times is not above the standard range (not longer than the upper-limit allowance time for the total standard operation time), that is, "NO" in step S21, the evaluating unit 22 outputs a warning indicating that operations vary in step S23. That is, if the total sum of the actual operation times is within the standard range tough there is an operation item in which the actual operation time is outside the standard range, there is a possibility that operations vary, for example, an operation and recording of a result have not sequentially been performed. Thus, the evaluating unit 22 outputs a warning indicating that operations vary. The output unit 24 displays, for example, a warning indicating that operations vary.

Also, the output unit 24 may display the table showing the comparison results illustrated in FIG. 6, such that the field of the operation item in which the actual operation time is outside the standard range is distinguished from the fields of the other operation items.

As described above, in the operation reliability evaluation apparatus 10 according to the exemplary embodiment, actual operation times of individual operation items are obtained on the basis of writing actions performed on the medium 40 by a user, and an operation item in which the actual operation item is outside the standard range is detected, and thereby the reliability of operations is evaluated. For example, even if a value which seems to be correct is on the medium 40, such as a checklist, if the actual operation time is below the standard range, it is determined that there is a possibility that an inspection operation or the like has not actually been performed, and an error is detected. That is, if an operator inputs an operation result to the medium 40 though the operator has not performed an operation, the fact that the operation has not been performed is detected through comparison of an actual operation time and a standard operation time. In this way, an operation item for which an operation has not been performed is detected even if it seems that the operation has been performed. If the actual operation time is above the standard range, it is determined that there is a possibility that an unnecessary operation or an unscheduled operation has been performed. In this way, with the use of the information supplied from the electronic pen 30, which is used in a writing action performed on the medium 40, the reliability of an operation is evaluated without using another device even if it is difficult to evaluate the reliability of the operation on the basis of an operation result input to the medium 40.

Alternatively, the evaluating unit 22 may compare actual operation times of individual operators and output a comparison result. Accordingly, differences or variations of operations among the operators are detected. The output unit 24 may display the comparison result. The evaluating unit 22 may compare the total sums of the actual operation times of the individual operators and output a comparison result. For example, each operator inputs user identification information for identifying the operator (for example, a user name or user ID) to the medium 40 by using the electronic pen 30. Then, the operation reliability evaluation apparatus 10 receives the user identification information from the electronic pen 30, associates the user identification information with stroke information, and manages the stroke information about each operator.

Alternatively, a medium having the same content as the medium 40 (hereinafter referred to as "attached medium") may be provided to an operation target, and an operator may input an operation result regarding an operation item to the medium 40 held by the operator by using the electronic pen 30, and also may input the operation result regarding the operation item to the attached medium by using the electronic pen 30. The medium 40 and the attached medium are checklists having the same content, for example, as illustrated in FIG. 2, and have pieces of code information embedded with different pieces of identification information (document IDs). The attached medium corresponds to an example of a first medium, and the medium 40 held by the operator corresponds to an example of a second medium. The stroke information obtaining unit 12 obtains stroke information about the medium 40 and stroke information about the attached medium from the electronic pen 30. Then, the evaluating unit 22 compares an operation result which is input to the medium 40 and which is specified on the basis of writing information with an operation result which is input to the attached medium and which is specified on the basis of writing information, and outputs the comparison result. Also, the evaluating unit 22 may detect an operation item in which the actual operation time is outside the standard range, compare the operation result input to the medium 40 with the operation result input to the attached medium, and output the comparison result. The output unit 24 displays, for example, the comparison result. For example, if the operation result input to the medium 40 is different from the operation result input to the attached medium, the evaluating unit 22 may output information or warning indicating the operation item having the difference. In this way, as a result of comparing the operation result input to the medium 40 held by the operator with the operation result input to the attached medium, it is determined whether or not the operator has actually come to the operation target. For example, if the operation result input to the medium 40 matches the operation result input to the attached medium, it is determined that the operator has actually come to the operation target. On the other hand, if the operation results do not match, it is determined that there is a possibility that the operator has not actually come to the operation target. For example, in a case where an operation result has been input to the medium 40 held by the operator but has not been input to the attached medium, it is determined that there is a possibility that the operator has not actually come to the operation target. Also, the evaluating unit 22 may compare the operation execution time input to the medium 40 or the attached medium with the time indicated by stroke information, and may evaluate the reliability of an operation on the basis of the difference in time.

Alternatively, the reliability of an operation may be evaluated in view of a transition time which is taken for transition from an operation to another operation. For example, a position information obtaining unit that obtains position information by using a global positioning system (GPS) or the like is provided in the electronic pen 30, and position information indicating the position of the electronic pen 30 is obtained by the position information obtaining unit. The operation time calculating unit 18 obtains position information indicating the positions of the electronic pen 30 and time information indicating times at the individual positions from the electronic pen 30, detects a movement of the operator between operations on the basis of the positions of the electronic pen 30, and calculates the time taken for the movement between the operations (transition time) on the basis of the times at the individual positions. Then, the operation time calculating unit 18 subtracts the transition time from the operation time, which has been calculated on the basis of the input end times of two sequential operation items, and thereby calculates an operation time which does not include the transition time. The evaluating unit 22 evaluates the reliability of the operation of each operation item, on the basis of the operation time which does not include a transition time. In this way, the reliability of an operation may be evaluated on the basis of an operation time which does not include a transition time.

First Exemplary Modification

Next, a first exemplary modification will be described. In the above-described exemplary embodiment, description has been given of an example in which the reliability of each operation is evaluated by calculating the operation time of each operation item. Alternatively, the operation reliability evaluation apparatus 10 may evaluate the reliability of each operation by determining the order in which the operations of individual operation items have been performed.

For example, the operation time calculating unit 18 specifies the order in which the operations of the individual operation items have been performed, on the basis of the input start times and the input end times of the individual operation items. The standard information storage unit 20 stores information indicating a standard operation order of the individual operation items. The standard operation order is predetermined in accordance with, for example, experiences. The evaluating unit 22 compares the operation order obtained by the operation time calculating unit 18 with the standard operation order, and detects an operation item for which the operation has been performed in an order different from the standard operation order. In this case, the evaluating unit 22 may output a warning. As in the above-described exemplary embodiment, the output unit 24 may display information or warning indicating the operation item detected by the evaluating unit 22.

If there is an operation item for which the operation has been performed in an order different from the standard operation order, there is a possibility that the work content has been changed. For example, there is a possibility that operations have been performed in an order different from the previous operation order. In this case, the operation item for which the operation has been performed in an order different from the standard operation order is detected as an operation item for which an operation that does not satisfy a predetermined standard has been performed. In this way, the operation order is determined on the basis of the information supplied from the electronic pen 30. Accordingly, even if it is difficult to evaluate the reliability of an operation on the basis of an operation result input to the medium 40, the reliability of the operation is evaluated without using another device. For example, even if the operation order is unknown from the content input to the medium 40, the operation order is determined on the basis of the information supplied from the electronic pen 30, and the reliability of operations is evaluated.

The evaluating unit 22 may detect an operation item in which the actual operation time is outside the standard range, and also may detect an operation item for which the operation has been performed in an order different from the standard operation order.

Second Exemplary Modification

Next, a second exemplary modification will be described. The operation reliability evaluation apparatus 10 may calculate the input times taken to input operation results of individual operation items, and may evaluate the reliability of operations on the basis of the input times.

For example, the operation time calculating unit 18 calculates the time difference between the input start time and the input end time of the same operation item, and the time difference is regarded as an input time taken to input an operation result for the operation item. In the example illustrated in FIG. 4, the operation time calculating unit 18 calculates the time difference between the input start time and the input end time of the operation item "measurement time", and the time difference is regarded as an input time taken to input an operation result for the operation item "measurement time". Also, the operation time calculating unit 18 calculates the time differences between the input start times and the input end times of the operation items "input temperature", "unusual noise", and "motor current", and the time differences are regarded as input times of the operation items "input temperature", "unusual noise", and "motor current". In the following description, an input time calculated by the operation time calculating unit 18 is referred to as "actual input time".

The standard information storage unit 20 stores information indicating standard input times which are supposed to be taken to input operation results for individual operation items, and information indicating allowance times which are allowed in input of the operation results for the individual operation items. The allowance times include an upper-limit allowance time and a lower-limit allowance time. Thus, the range defined by "standard input time±allowance time" is the range of allowable input time. The standard information storage unit 20 may store information indicating the total sum of the standard input times of plural operation items. For example, the standard information storage unit 20 stores information indicating the total sum of the standard input times of all the operation items which are performed in inspection of the facilities. The standard input times and the allowance times are predetermined in accordance with, for example, experiences.

The evaluating unit 22 compares the actual input times calculated by the operation time calculating unit 18 with the standard input times, and detects an operation item in which the time difference between the actual input time and the standard input time is longer than or equal to a predetermined time. For example, the evaluating unit 22 detects an operation item in which the actual input time is outside the range defined by "standard input time±allowance time". In this case, the evaluating unit 22 may output a warning. The output unit 24 may display information or warning indicating the operation item detected by the evaluating unit 22, as in the above-described exemplary embodiment.

For example, if the actual input time is shorter than the lower-limit allowance time, it indicates that the operation result was input in a time shorter than the supposed standard time, and thus there is a possibility that an inspection operation or the like has not been performed. If the actual input time is longer than the upper-limit allowance time, it indicates that the operation result was input in a time longer than the supposed standard time, and thus there is a possibility that an unnecessary operation or an unscheduled operation has been performed. Thus, an operation item in which the actual input time is outside the range defined by "standard input time±allowance time" is detected as an operation item for which the operation that does not satisfy a predetermined standard has been performed. In this way, an actual input time is calculated on the basis of the information supplied from the electronic pen 30, and an operation item in which the actual input time is outside the standard range is detected. Accordingly, even if it is difficult to evaluate the reliability of an operation on the basis of the operation result input to the medium 40, the reliability of the operation is evaluated without using another device. For example, even if an operation result has been input to the medium 40 and it looks like an operation has been normally performed, an operation item for which an operation has not been performed or an operation item for which an unnecessary operation or an unscheduled operation has been performed is detected by calculating an actual input time on the basis of the information supplied from the electronic pen 30, and the reliability of the operation is evaluated.

The evaluating unit 22 may detect an operation item in which the actual input time is outside the range defined by "standard input time±allowance time", and may detect an operation item for which the operation has been performed in an order different from the standard operation order.

Third Exemplary Modification

The evaluating unit 22 may evaluate the reliability of an operation by comparing the input start time and the input end time among operation items. For example, the evaluating unit 22 compares the input end time of the operation item for which the operation is to be performed first with the input start time of the operation item for which the operation is to be performed subsequently. If the input start time of the subsequent operation item is earlier than the input end time of the first operation item, the evaluating unit 22 detects the first operation item and the subsequent operation item. With reference to FIG. 9, the operation of the operation item "motor current" is to be performed after the operation of the operation item "unusual noise". However, the input start time of the operation item "motor current" is "07:14:18.60", which is earlier than the input end time of the operation item "unusual noise" "07:14:20.80". According to a standard order, input of the operation result for the operation item "motor current" is to be started after input of the operation result for the operation item "unusual noise" has finished. However, input of the operation result for the operation item "motor current" is started before input of the operation result for the operation item "unusual noise" has finished. In this case, there is a possibility that something wrong has occurred in the operation order. In this case, the evaluating unit 22 detects the operation item "unusual noise" and the subsequent operation item "motor current". The output unit 24 may display information indicating the operation items detected by the evaluating unit 22. In this way, input start times and input end times are obtained on the basis of the information supplied from the electronic pen 30, and abnormality in the operation order is detected. Accordingly, even if it is difficult to evaluate the reliability of an operation on the basis of an operation result input to the medium 40, the reliability of the operation is evaluated without using another device. For example, even if the operation order is unknown from the content input to the medium 40, the operation order may be determined on the basis of the information supplied from the electronic pen 30, and the reliability of the operation is evaluated. The evaluating unit 22 may detect an operation item in which the actual operation time or actual input time is outside the standard range, and may detect abnormality in the operation order.

Hardware Configuration

The above-described operation reliability evaluation apparatus 10 includes a processor, such as a central processing unit (CPU), which is not illustrated. The processor executes a program stored in a memory, which is not illustrated, and thereby realizes the functions of the stroke information obtaining unit 12, the operation item specifying unit 16, the operation time calculating unit 18, and the evaluating unit 22. The above-described program is stored in a storage device, such as a hard disk drive (HDD), via a recording medium such as a compact disc (CD) or a digital versatile disc (DVD) or via a communication path such as a network. The above-described program may be stored in advance in the storage device, such as an HDD. The program stored in the storage device, such as an HDD, is read out to a memory, such as a random access memory (RAM), and is executed by the processor, such as a CPU. Accordingly, the functions of the above-described stroke information obtaining unit 12, operation item specifying unit 16, operation time calculating unit 18, and evaluating unit 22 are realized.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an obtaining unit that obtains position information and time information, the position information indicating a position at which a writing action has been performed and which is specified in accordance with code information formed on a medium to which an operation result for operation items is input by the writing action, the time information indicating a time at which the writing action was performed;
a specifying unit that specifies, in accordance with the position information, an operation item for which the writing action has been performed;
a calculating unit that calculates, in accordance with the time information, an operation time taken to perform an operation of the operation item for which the writing action has been performed; and
an evaluating unit that detects an operation item in which a time difference between the operation time calculated by the calculating unit and a predetermined standard operation time taken to perform the operation of the operation item for which the writing action has been performed is longer than or equal to a predetermined time.

2. The information processing apparatus according to claim 1, wherein the calculating unit calculates a time difference between an end time of a writing action for a first operation item and an end time of a writing action for a second operation item, the writing action for the second operation item being performed next to the writing action for the first operation item, the time difference being regarded as an operation time taken to perform an operation of the second operation item.

3. The information processing apparatus according to claim 1, wherein, if the evaluating unit detects an operation item in which a time difference between the operation time calculated by the calculating unit and the standard operation time is longer than or equal to the predetermined time, the evaluating unit outputs a warning in accordance with a time difference between a total sum of operation times of all operation items for which the operation result has been input and a total sum of standard operation times of all the operation items.

4. The information processing apparatus according to claim 2, wherein, if the evaluating unit detects an operation item in which a time difference between the operation time calculated by the calculating unit and the standard operation time is longer than or equal to the predetermined time, the evaluating unit outputs a warning in accordance with a time difference between a total sum of operation times of all operation items for which the operation result has been input and a total sum of standard operation times of all the operation items.

5. The information processing apparatus according to claim 1, wherein the calculating unit further calculates, in accordance with the time information, an order in which operations of the individual operation items have been performed, and wherein the evaluating unit further detects an operation item for which an operation has been performed in an order different from a predetermined standard operation order.

6. The information processing apparatus according to claim 2, wherein the calculating unit further calculates, in accordance with the time information, an order in which operations of the individual operation items have been performed, and wherein the evaluating unit further detects an operation item for which an operation has been performed in an order different from a predetermined standard operation order.

7. The information processing apparatus according to claim 3, wherein the calculating unit further calculates, in accordance with the time information, an order in which operations of the individual operation items have been performed, and wherein the evaluating unit further detects an operation item for which an operation has been performed in an order different from a predetermined standard operation order.

8. The information processing apparatus according to claim 4, wherein the calculating unit further calculates, in accordance with the time information, an order in which operations of the individual operation items have been performed, and wherein the evaluating unit further detects an operation item for which an operation has been performed in an order different from a predetermined standard operation order.

9. The information processing apparatus according to claim 1, wherein the evaluating unit compares an operation result which has been input to a first medium provided to an operation target and which has been specified in accordance with the position information, with an operation result which has been input to a second medium different from the first medium and which has been specified in accordance with the position information, and outputs a comparison result.

10. The information processing apparatus according to claim 2, wherein the evaluating unit compares an operation result which has been input to a first medium provided to an operation target and which has been specified in accordance with the position information, with an operation result which has been input to a second medium different from the first medium and which has been specified in accordance with the position information, and outputs a comparison result.

11. The information processing apparatus according to claim 3, wherein the evaluating unit compares an operation result which has been input to a first medium provided to an operation target and which has been specified in accordance with the position information, with an operation result which has been input to a second medium different from the first medium and which has been specified in accordance with the position information, and outputs a comparison result.

12. The information processing apparatus according to claim 4, wherein the evaluating unit compares an operation result which has been input to a first medium provided to an operation target and which has been specified in accordance with the position information, with an operation result which has been input to a second medium different from the first medium and which has been specified in accordance with the position information, and outputs a comparison result.

13. The information processing apparatus according to claim 5, wherein the evaluating unit compares an operation result which has been input to a first medium provided to an operation target and which has been specified in accordance with the position information, with an operation result which has been input to a second medium different from the first medium and which has been specified in accordance with the position information, and outputs a comparison result.

14. The information processing apparatus according to claim 6, wherein the evaluating unit compares an operation result which has been input to a first medium provided to an operation target and which has been specified in accordance with the position information, with an operation result which has been input to a second medium different from the first medium and which has been specified in accordance with the position information, and outputs a comparison result.

15. The information processing apparatus according to claim 7,
wherein the evaluating unit compares an operation result which has been input to a first medium provided to an operation target and which has been specified in accordance with the position information, with an operation result which has been input to a second medium different from the first medium and which has been specified in accordance with the position information, and outputs a comparison result.

16. An information processing method executed by a processor a memory storing instructions for executing operations comprising:
obtaining position information and time information, the position information indicating a position at which a writing action has been performed and which is specified in accordance with code information formed on a medium to which an operation result for operation items is input by the writing action, the time information indicating a time at which the writing action was performed;
specifying, in accordance with the position information, an operation item for which the writing action has been performed;
calculating, in accordance with the time information, an operation time taken to perform an operation of the operation item for which the writing action has been performed; and
detecting an operation item in which a time difference between the operation time calculated by the calculating and a predetermined standard operation time taken to perform the operation of the operation item for which the writing action has been performed is longer than or equal to a predetermined time.

17. An information processing apparatus comprising:
a detecting unit that detects that a writing action has been performed on a medium;
a reading unit that reads position information on the medium when the detecting unit detects that a writing action has been performed on the medium;
an obtaining unit that obtains time information indicating a time at which the detecting unit detects that a writing action has been performed on the medium;
a memory that stores the position information and the time information in association with each other;
an operation item memory that stores operation items and pieces of position information in association with each other;
a time specifying unit that specifies first time information indicating a time at which a writing action was performed for a first operation item and second time information indicating a time at which a writing action was performed for a second operation item, by referring to the memory and the operation item memory, the first operation item and the second operation item being included in the operation items stored in the operation item memory, the first time information and the second time information being included in the time information obtained by the obtaining unit; and
a calculating unit that calculates a difference between the first time information and the second time information, the difference being regarded as an operation time of the first operation item.

18. The information processing apparatus according to claim 17, further comprising:
an evaluating unit that evaluates whether or not the operation time calculated by the calculating unit is longer than an operation time which is predetermined for the specified operation item.

19. The information processing apparatus according to claim 17,
wherein the time specifying unit specifies third time information indicating a time at which a writing action was performed for a third operation item, by referring to the memory and the operation item memory,
wherein the information processing apparatus further comprises an end time obtaining unit that obtains fourth time information indicating a time at which a writing action for the third operation item finished,
wherein the calculating unit calculates a difference between the second time information and the third time information, the difference being regarded as an operation time of the second operation item, and also calculates a difference between the third time information and the fourth time information, the difference being regarded as an operation time of the third operation item, and
wherein the information processing apparatus further comprises an evaluating unit that evaluates whether or not a total time of the operation times of the first operation item, the second operation item, and the third operation item is longer than a predetermined time.

20. The information processing apparatus according to claim 19, further comprising:
a warning unit that outputs a warning in accordance with how much the total time of the operation times of the first operation item, the second operation item, and the third operation item is longer than the predetermined time.

* * * * *